Fig_1

INVENTOR.
EDWARD A. SCHLERNITZAUER
BY
ET McCabe
ATTORNEY

United States Patent Office
3,397,868
Patented Aug. 20, 1968

3,397,868
METHOD FOR DISPENSING AND MIXING MEASURED AMOUNTS OF LIQUID
Edward A. Schlernitzauer, La Grange Park, Ill., assignor to Swift & Company, Chicago, Ill., a corporation of Illinois
Original application June 1, 1964, Ser. No. 371,396, now Patent No. 3,326,530, dated June 20, 1967. Divided and this application Apr. 25, 1967, Ser. No. 633,610
5 Claims. (Cl. 259—8)

ABSTRACT OF THE DISCLOSURE

Liquid-form flavoring ingredients are mixed in desired proportions for subsequent introduction into a food emulsion by first introducing a brine solution at about 32° F. into a mixing vessel and then successively adding thereto a lesser quantity of heated syrup and a minor portion of liquid spice while agitating the liquids within the vessel. Apparatus includes a mixing vessel with discharge valves, and an agitator. Brine and syrup supplies are connected through conduits with suitable flow indicators and valves; and a plurality of spices are available through separate pressurized reservoirs and dispensing valves.

---

This application is a division of my copending application Ser. No. 371,396, filed June 1, 1964, now Patent No. 3,326,530.

The present invention deals generally with a method for dispensing liquid; and more specifically relates to an improved method for dispensing and mixing measured amounts of liquid flavoring ingredients for meat emulsions.

In the meat packing industry sausage constitutes a large volume of product. In the preparation of such products, meat emulsions are prepared according to various formula and selected flavoring agents and amounts of water are mixed therewith to produce a characteristic type of sausage. Literally hundreds of different sausage products are known. Most incorporate at least certain quantities of water, as well as salt, sugar and seasoning ingredients with a meat emulsion. The seasoning ingredients may vary widely in specific recipes for certain sausage products. Some seasoning recipes are highly guarded secrets; however several large companies have been established to provide standard seasoning recipes to the packing industry. Recently, some recipes have been produced in liquid form.

Heretofore, the general procedure for mixing salt, sugar and seasoning into a meat emulsion has required each of the named ingredients to be measured out in dry form, then added and mixed into the emulsion. Where such ingredients are introduced in the dry form, the emulsion has required working for a substantial period of time to obtain uniform distribution. Even where a liquid spice formula has been used, the mixing of salt and sugar has required lengthy processing.

It is accordingly a principal object of this invention to provide an improved method for measuring and dispensing salt, sugar and spice ingredients and mixing same together for rapid, uniform inclusion in a food emulsion.

Briefly, the present invention contemplates the dispensing of measured quantities of brine, syrup, and liquid spice into a mixing zone wherein said ingredients are agitated to provide a uniform fluid, and wherefrom such fluid is discharged for inclusion into a food emulsion.

An apparatus of the present invention comprises a vessel having a discharge means in its lower extremity and an agitator means therein, with liquid measuring and dispensing means for brine, syrup, and spice.

Figure 1:
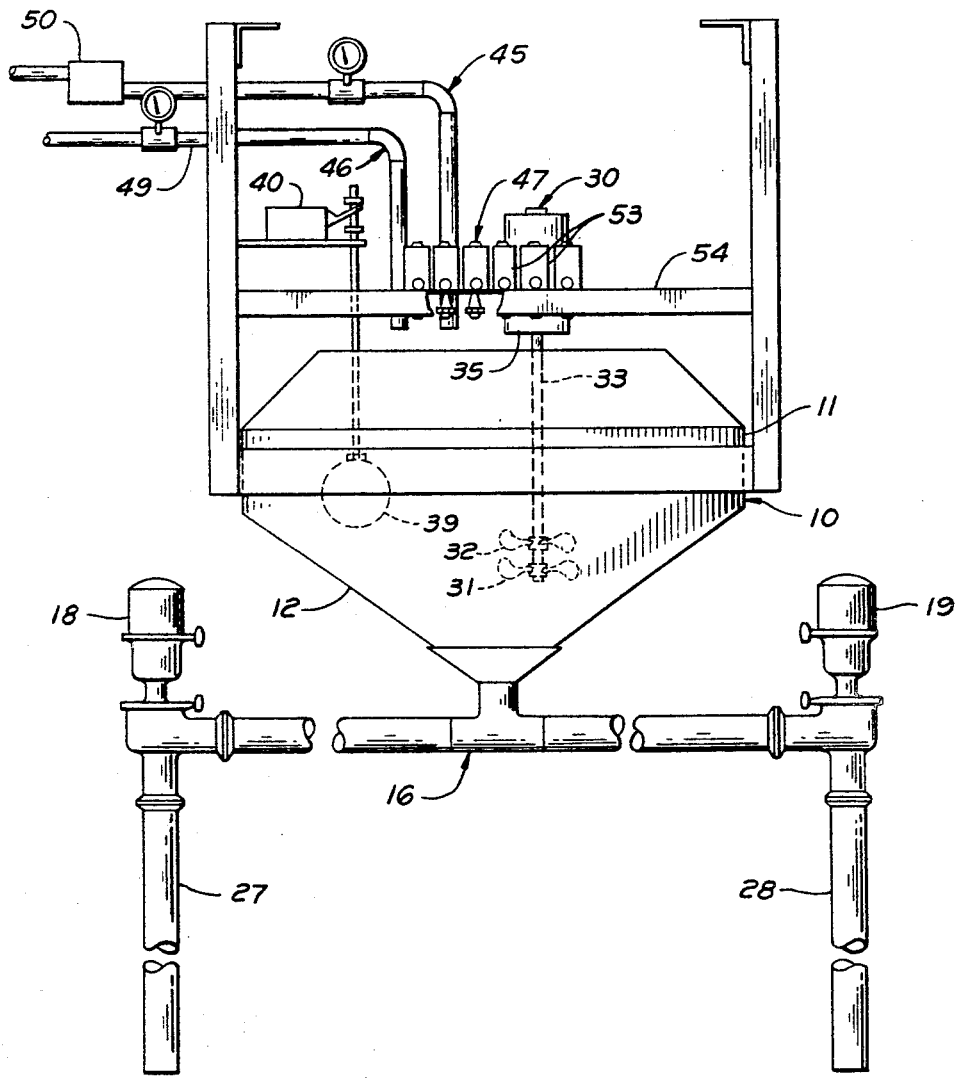
Figure 2:
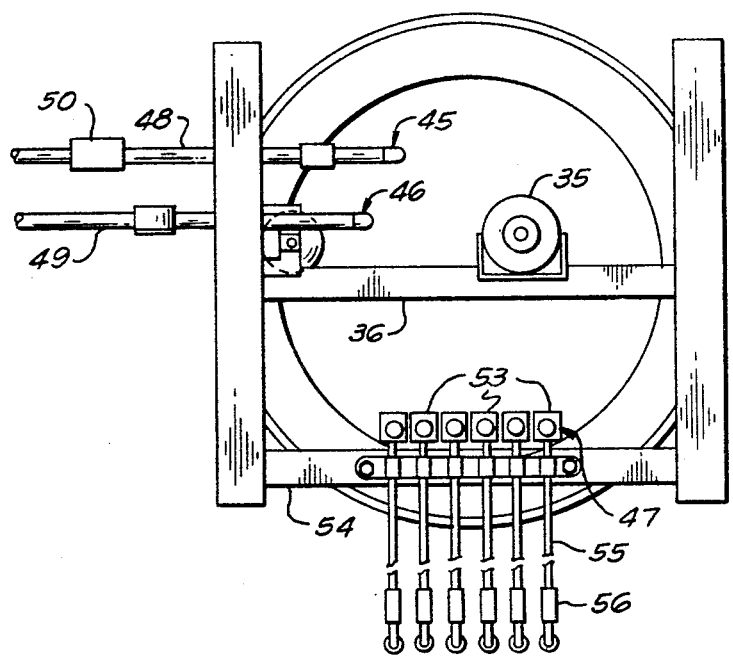
Figure 3:
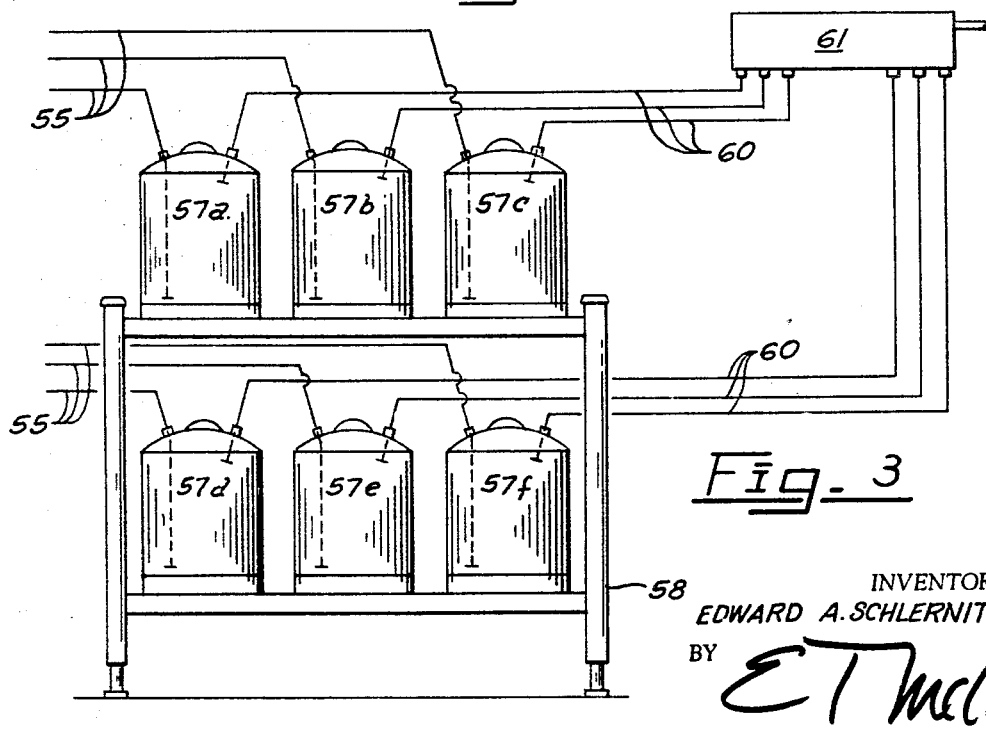
Figure 4:
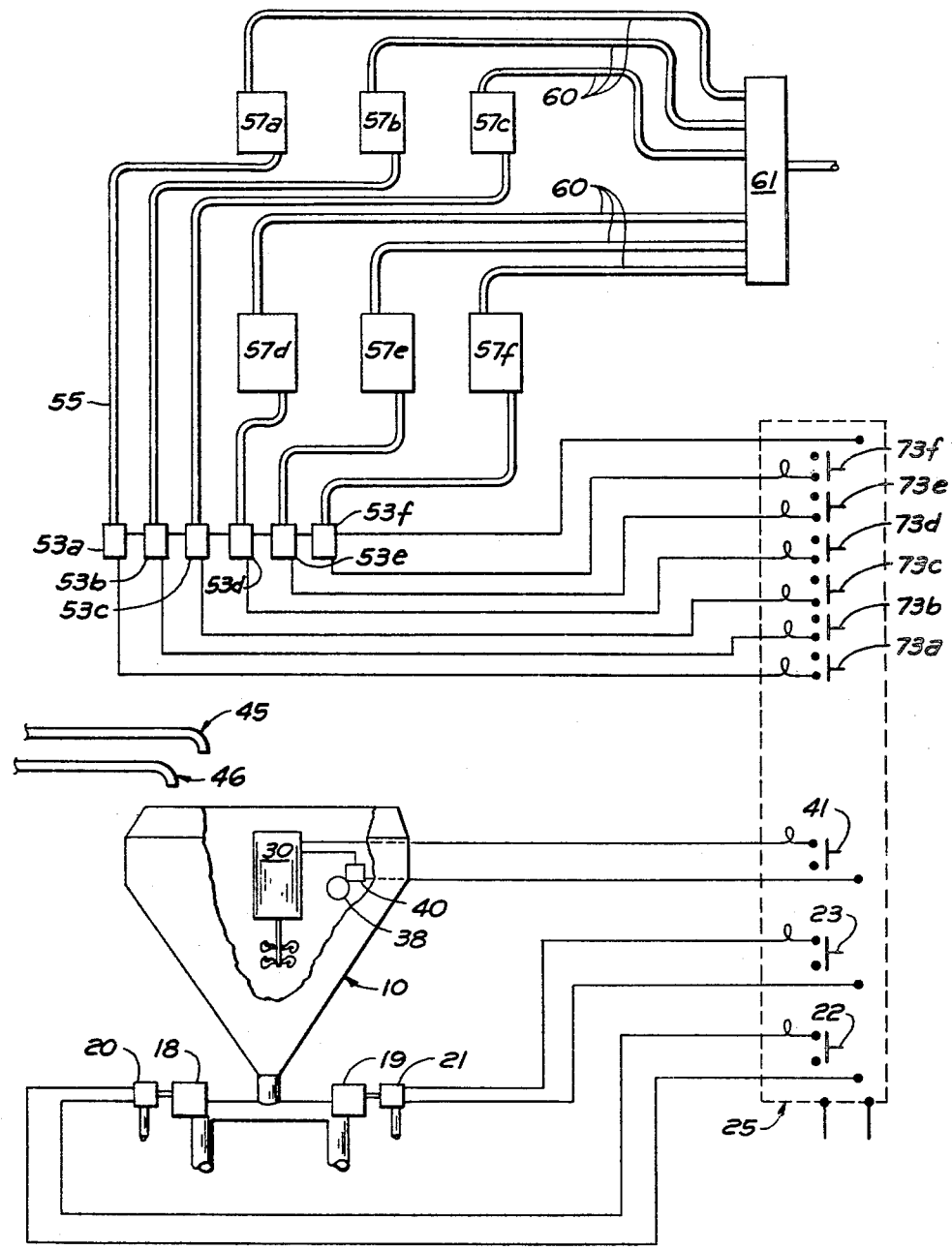
Figure 5:
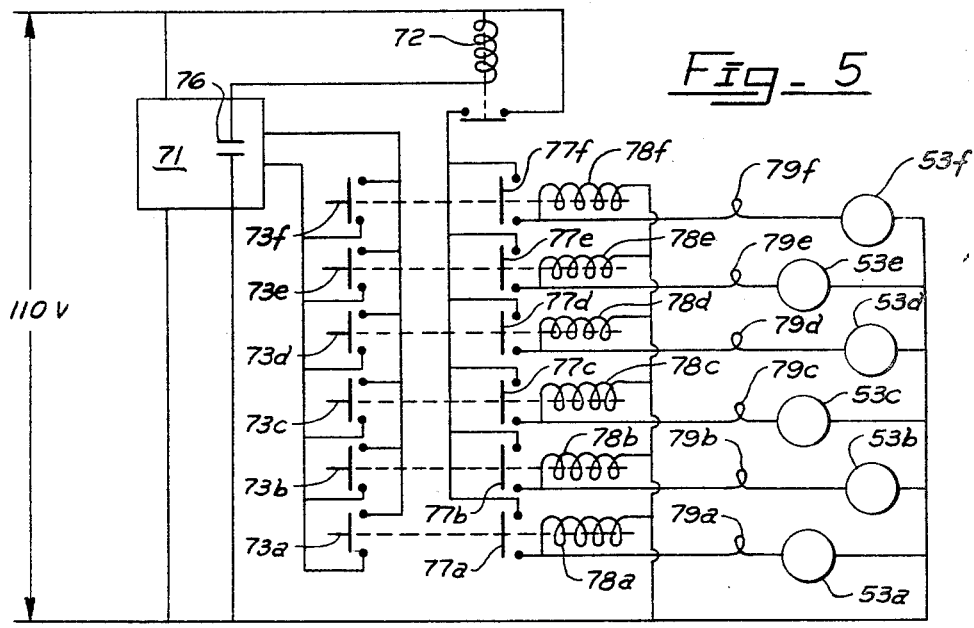
Figure 6:
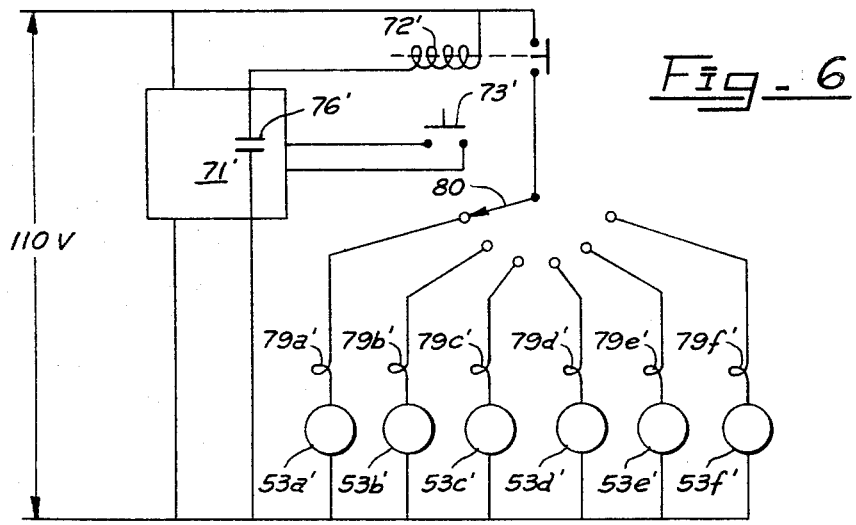

Further advantages and objectives of the present invention will become apparent from the following specification when taken in conjunction with the drawings wherein:

FIGURE 1 is a front elevation view of a preferred apparatus for performing the present invention;
FIGURE 2 is a plan view of the apparatus of FIGURE 1;
FIGURE 3 is a front view of a liquid spice supply means for the present invention;
FIGURE 4 is a schematic diagram of the apparatus of the present invention;
FIGURE 5 is a control circuit diagram for the spice supply means; and
FIGURE 6 is a diagram of an alternate spice control circuit.

According to the present invention, all of the necessary flavoring agents for a sausage emulsion are prepared in liquid form. Salt is provided as brine, a solution in water of about 3% sodium chloride is preferred; and sugar is provided as a syrup, preferably a glucose solution. Similarly, all spice formulas are procured in liquid form and diluted to a uniform viscosity and strength. In addition to a saving in time for measuring, mixing, and distributing these ingredients in liquid form, a further advantage is obtained in that at least a substantial portion of the additional water necessary to a sausage formula is also provided thereby and acts as a carrier to rapidly and uniformly distribute the flavoring agents throughout a food emulsion.

Furthermore, the brine is preferably provided at a chilled temperature of about 32° F. and in largest quantity so that a relatively cool flavoring solution will be available to keep the ultimate food emulsion at low temperature and reduce the requirement for ice which has heretofore been used to introduce water and reduce the temperature of such emulsions. The syrup, however, is preferably heated to about 100° F. to reduce its normal viscosity so that it may be readily introduced, in a lesser amount, into the larger volume of brine. Where the syrup is introduced in such heated condition, it will not jell upon reaching the chilled brine, but will remain highly fluid for a sufficient period to be uniformly distributed throughout the brine by agitation.

From the foregoing it will be seen that it is essential to this process that the brine be first introduced into a mixing zone and the syrup only thereafter is introduced into the brine within said zone and preferably only after agitation of the brine has commenced.

A liquid spice formula of a desired recipe is also added to the brine in the mixing zone while under agitation. Preferably, the spice formula is added subsequent to or concurrently with the syrup. The liquid spice normally constitutes a very minor liquid portion and the temperature thereof is inconsequential.

Following the introduction of the aforementioned ingredients into the mixing zone, the liquid flavoring mixture is agitated for a sufficient period, preferably about three minutes, to insure uniform distribution of all ingredients. Thereafter the mixture may be discharged, on need, to a batch or stream of food emulsion.

A preferred apparatus for carrying out the foregoing method may be seen in the figures wherein a mixing vessel generally 10 is provided comprising an open top cylindrical upper portion 11, and a conical bottom 12 which terminates in a discharge means generally 16. Preferably the latter comprises a T pipe extending in two opposite directions beneath the vessel 10 to oppositely disposed discharge valves 18, 19. The discharge valves are preferably operated by pressurized air and are actuated through a pair of solenoid pilot valves 20, 21, respectively. The latter divert pressurized and lubricated air from a source, not shown, to the discharge valves 18, 19 upon being energized through electrical switches 22, 23, respectively, series connected between the respective solenoid pilot valves 20, 21 and a source of electric power. The switches 22, 23 may be seen in FIGURE 4 to be mounted upon a control panel generally 25.

Discharge lines 27, 28, respectively, extend from each of the valves 18, 19 to food emulsion equipment, not shown. In operation, a batch of mixed flavoring liquid will be discharged from the vessel 10 through only one of the valves 18 or 19 whichever leads to emulsion then requiring the flavoring agents. Obviously the present apparatus could be provided with but a single discharge valve where there is only one terminal location of food emulsion.

As will also be seen in the figures, the vessel generally 10 is provided with internally located agitator means generally 30. Preferably the latter includes a pair of mixing blades 31, 32 mounted upon a single shaft 33 which extends downwardly into the vessel from a motor drive unit 35, in turn fastened upon a mounting bracket 36 located above the top of the vessel. Since the preferred method calls for agitating brine before further ingredients are added, it is highly advantageous to provide for automatic actuation of the agitator means generally 30 by means of a float 39 and float switch 30 as shown in FIGURES 1 and 4. The float 39 is positioned in the lower portion of the vessel generally 10 and the upper end thereof is connected to actuate the float switch 40 when liquid contacts and buoys the float. The float switch 40 is connected, in the normal manner, in series between the motor drive unit 35 and a source of electric power. Also, it is preferable to include a manual disconnect switch 41, located on the control panel generally 25, in series between the float switch 40 and the source of electric power so that an operator may override automatic control to de-energize the agitator.

Liquid supply means comprising three parts, namely, a syrup supply means generally 45, a brine supply means generally 46, and a spice formula supply means generally 47, are located above the open top of the vessel generally 10. Both the syrup supply means and brine supply means may simply comprise relatively large conduits 48, 49, respectively, both of which are connected to separate reservoirs (not shown) through well-known flow meters and control valves. Preferably, however, the syrup supply means generally 45 is provided with a heat exchanger 50 through which the conduit 48 extends whereby liquid syrup may be heated to increased temperature.

Concerning the spice formula supply means generally 47, a plurality of solenoid operated dispensing valves 53 are secured directly above the top of vessel 10 upon a mounting shelf 54, as shown in FIGURES 1 and 2. Each valve 53 is of well known nondrip design. Six such dispensing valves have been found adequate to provide for most spice formulas required in the production of bologna, frankfurters, Braunschweiger and meat loaf type sausage products. It is to be understood that liquid coloring agents, and curing agents may be provided for such products, as well, through these dispensing valves.

Each dispensing valve 53 is connected by a small gauge conduit 55 through a strainer 56 (visible in FIGURE 2) to separate reservoir tanks 57 shown in FIGURES 3 and 4. It is advantageous to locate the aforementioned reservoir tanks 57 remotely from the vessel 10 so that they may be easily serviced and refilled with appropriate spice, color or cure formula. Such tanks 57 may be conveniently mounted on a rack 58.

Normally, the charge of spice, or the like, to a batch of flavoring liquid in the vessel 10 will constitute only a few ounces of liquid, whereas both brine and syrup are delivered in quantities of many pounds. Accordingly, the dispensing of measured quantities of spice and the like must be more accurate than for brine and syrup. To accomplish this, the preferred apparatus was devised to accurately dispense liquid spice at a uniform known rate and control the measure of such spice by limiting the time that it is dispensed. Accordingly, the liquid conduits 55 each extend to the bottom of the several reservoir tanks 57, and each tank is maintained at a uniform pressure of preferably about 20 p.s.i.g. by means of air pressure lines 60 attached to the upper ends thereof. Each of the air pressure lines 60 is in turn connected to a distribution manifold 61 which receives dry oil-free pressurized air from a source, not shown. Whenever a given dispensing valve 53 is opened, the selected spice liquid will be forced therefrom at a uniform rate by the constant pressure in the appropriate tank 57.

Selection of the desired dispensing valve 53 is provided by an electrical control means preferably located at the control panel 25. Two suitable control circuits are shown in FIGURES 5 and 6. Each includes a timer 71 and relay 72 with one or more timer actuator switches 73 and valve selector switches 74. The control circuit shown in FIGURE 5 comprises a plurality of timer actuator switches 73(a)–73(f) corresponding to the number of solenoid dispensing valves 53a–53f. Each of the timer actuator switches are connected, in parallel, to the timer 71 which is energized across a 110 volt power supply. The timer 71 includes an internal switch 76 which is closed upon the closing of any actuator switch 73, and will remain closed until the timer times out a preset interval. The timer switch 76 is series connected with the coil of the relay 72 and the power supply. Thus, when the timer switch 76 is closed, the relay 72 will be energized to close the relay contacts. The latter are connected in series between the power supply and a bank of parallel connected valve switches 77a–77f. The latter are series connected with corresponding solenoids of the dispensing valves 53a–53f, respectively. Each of the valve switches 77 is mechanically linked with the corresponding timer actuator switch 73 so that both will be closed simultaneously. Holding coils 78a–78f are provided for each valve switch 77a–77f to maintain the latter closed until the circuit is broken by the timer 71. Also appropriate indicator lamps 79a–79f may be provided in series between the valve switches 77 and valve solenoids 53 to visibly display an energized valve at the control panel 25.

It may be readily followed in FIGURE 5 that when any one selected timer actuator switch 73 is closed, the internal timer switch 76 will close energizing relay 72 and thus completing an electrical connection to one side of each of the valve switches 77a–77f. The corresponding valve switch 77 will have been closed at the same time, and thus a circuit will be instantaneously completed through the corresponding dispenser valve solenoid 53 and indicator lamp 79. At the same instant, a circuit will also be completed through the corresponding holding coil 78 to thus maintain the appropriate valve switch 77 closed. The described circuits will remain closed until the timer times out, thereby opening switch 76 and de-energizing relay 72. At that moment the contacts of relay 72 will open, breaking the circuit to the energized dispensing valve 53. It should be noted that relay 72 is included in the circuit because experience has shown that a minor but significant electrical leakage may occur across the timer, in the humid environment of a packing house, which would be sufficient to maintain a dispensing valve 53 partially open. The present control circuits insure complete electrical interruption to the dispensing valves at the end of the time control interval.

The alternate control circuit shown in FIGURE 6 is subsatntially the same as that shown in FIGURE 5 except that single timer actuator switch 73' is provided and a multipositioned selector switch 80 is substituted for a plurality of valve switches. In the latter circuit, holding coils are unnecessary since a selected electrical path will be maintained through the seletor switch 80 between the contacts of relay 72' and the appropriate dispensing valve solenoid 53'.

Obviously many modifications and variations of the invention as hereinbefore set forth may be made without departing from the spirit and scope thereof, and therefore only such limitations should be imposed as are indicated in the appended claims.

I claim:

1. An improved method for preparting flavoring ingredients for introduction into a food emulsion, said method comprising: first flowing a major quantity of a first liquid ingredient into a mixing zone; commencing agitation of said first liquid as it reaches a certain level in said zone; flowing a lesser quantity of a second liquid into said first liquid in said zone while continuing agitation; adding a minor portion of a selected liquid spice formula to said first liquid in said zone while being agitated; and thereafter flowing the mixture of said liquids from said zone while continuing to agitate the mixture in said zone.

2. The method of claim 1 wherein the mixture is agitated for a period of about three minutes after introduction of said spice formula and before flowing of the mixture from said zone.

3. The method of claim 1 wherein said first liquid is brine and said second liquid is syrup.

4. The method of claim 3 wherein the brine is introduced at about 32° F., the syrup is heated and introduced at about 100° F., and agitation is continued after adding said spice formula for a period of time suffiicent to produce a uniform mixture before flowing same from said zone.

5. The method of claim 4 wherein the brine is a 3% salt solution and the agitation of the complete mixture is continued for at least three minutes.

References Cited

UNITED STATES PATENTS

| | | | |
|---|---|---|---|
| 2,657,628 | 11/1953 | Stoeser | 259—8 X |
| 2,724,581 | 11/1955 | Pahl | 259—154 X |
| 3,041,049 | 6/1962 | Tarukawa | 259—9 |
| 3,224,738 | 12/1965 | Tarukawa | 259—154 X |

ROBERT W. JENKINS, *Primary Examiner.*